United States Patent
Haeusser-Boehm et al.

(10) Patent No.: US 6,531,834 B2
(45) Date of Patent: Mar. 11, 2003

(54) CIRCUIT ARRANGEMENT FOR CONTROLLING AN ANALOG VOLTAGE SIGNAL

(75) Inventors: Helmut Haeusser-Boehm, Muenchen (DE); Michael Schaller, Traunreut (DE)

(73) Assignee: Patent-Treuhand-Gesellschaft fuer Elektrische Gluehlampen mbH, Munich (DE)

( * ) Notice: Subject to any disclaimer, the term of this patent is extended or adjusted under 35 U.S.C. 154(b) by 0 days.

(21) Appl. No.: 09/962,326

(22) Filed: Sep. 26, 2001

(65) Prior Publication Data

US 2002/0036581 A1 Mar. 28, 2002

(30) Foreign Application Priority Data

Sep. 28, 2000 (DE) .......................... 100 48 189

(51) Int. Cl.[7] .................................. G05F 1/00
(52) U.S. Cl. ................... 315/291; 315/297; 315/307; 315/DIG. 4
(58) Field of Search ................. 315/291, 293, 315/294, 297, 307, 311, DIG. 4

(56) References Cited

U.S. PATENT DOCUMENTS 4,630,187 A  * 12/1986  Henze ................... 318/610
4,891,828 A  *  1/1990  Kawazoe ................ 315/291
5,559,467 A  *  9/1996  Smedley ................. 330/10
5,731,652 A  *  3/1998  Shimada ............. 310/316.01
6,011,416 A  *  1/2000  Mizuno et al. ........... 327/108

* cited by examiner

Primary Examiner—Haissa Philogene
(74) Attorney, Agent, or Firm—Carlo S. Bessone

(57) ABSTRACT

Circuit arrangement for controlling an analog voltage signal comprising an input connection for applying the analog voltage signal (UE), a digitizer unit (10) which uses the analog voltage signal (UE) to produce a digital signal (UED) which has a predetermined duty ratio when the analog voltage signal (UE) is at a nominal value, a PI regulator (12) to which, as the input signal, a nominal signal (USD) and an actual signal which is correlated with the digital signal (UED) can be supplied and at whose output a control signal (UST) for controlling the analog voltage signal (UE) can be produced, in such a manner that the control signal (UST) allows the analog voltage signal to be increased if the duty ratio is less than the predetermined duty ratio, allows the analog voltage signal to remain unchanged if the duty ratio corresponds to the predetermined duty ratio, and allows the analog voltage signal to be reduced if the duty ratio is greater than the predetermined duty ratio.

10 Claims, 2 Drawing Sheets

CIRCUIT ARRANGEMENT FOR CONTROLLING AN ANALOG VOLTAGE SIGNAL

BACKGROUND OF THE INVENTION

The present invention relates to a circuit arrangement for controlling an analog voltage signal.

In halogen lamps, for example, exact maintenance of the specified lamp voltage is a fundamental precondition for long life. An increase of 5–10% above the specified lamp voltage reduces the life of halogen lamps by about 50%.

Transformers which are known from the prior art for halogen lamps have feedback between the lamp load and the frequency. If, for example, the lamp load is high, the operating frequency decreases, while, when the lamp load is low, the operating frequency rises. The stray inductance of the transformer results in a frequency-dependent voltage drop, so that the output voltage which is then provided to the lamp remains virtually constant.

BRIEF SUMMARY OF THE INVENTION

The present invention is based on the object of providing a circuit arrangement which allows an analog voltage signal to be controlled in a simple manner.

According to the invention., this object is achieved by a circuit arrangement for controlling an analog voltage signal which comprises an input connection for applying the analog voltage signal, furthermore a digitizer unit which uses the analog voltage signal to produce a digital signal which has a predetermined duty ratio when the analog voltage signal is at a nominal value, a PI regulator to which, as the input signal, a nominal signal and an actual signal which is correlated with the digital signal can be supplied and at whose output a control signal for controlling the analog voltage signal can be produced, in such a manner that the control signal allows the analog voltage signal to be increased if the duty ratio is less than the predetermined duty ratio, allows the analog voltage signal to remain unchanged if the duty ratio corresponds to the predetermined duty ratio, and allows the analog voltage signal to be reduced if the duty ratio is greater than the predetermined duty ratio.

The present invention is based on the knowledge that the lamp voltage can be kept constant even for different mains voltages and lamp loads if the present lamp voltage is detected and is used to derive a suitable control signal, which can then be used for appropriate control of the frequency, the phase, the duty cycle or any other suitable variable, in order to maintain the output voltage at the nominal value. The preferred field of application is, in particular, externally controlled half-bridge circuits.

The solution according to the invention is distinguished in that it can be produced very cost-effectively and allows the lamp voltage to be detected and regulated in a manner which is virtually independent of component tolerances.

In the situation where the analog voltage signal is not yet in rectified form, an apparatus for rectifying the analog voltage signal can be provided between the input connection and the digitizer unit.

The PI regulator has a time constant Tp, with the digital signal being a signal, in particular a square-wave signal, at a frequency fd>1/Tp, in particular a multiple of it. Such design ensures that the control process does not take place hectically, that is to say even taking into account irrelevant high-frequency interference, but smoothly and moderately.

The digitizer unit preferably comprises a voltage divider by means of which a partial input voltage signal can be produced which corresponds to the analog input voltage signal, a series circuit having a zener diode and a resistor, to which the partial input voltage signal can be supplied, and a switching element to which the signal at the junction point between the zener diode and the resistor can be supplied as a control signal. Such an embodiment of a digitizer unit allows the predetermined duty ratio to be varied in a particularly simple manner, to be precise by the use of different values in the voltage divider. This means that the circuit arrangement according to the invention can be used universally for controlling a large number of different analog voltage signals.

In one particularly preferred development, an optocoupler is arranged between the digitizer unit and the PI regulator. The optocoupler ensures DC isolation between the input and output of the circuit arrangement and allows the circuit arrangement according to the invention to be used even in circuits which have to comply with SELV (Secure Extra Low Voltage) conditions. In this case, the optocoupler is preferably connected in series with an output connection of the switching element. If, for example, the switching element is a transistor, the transistor current flows through the light-emitting unit of the optocoupler, and the light emitted is correlated with the digital signal.

Furthermore, the output signal from the optocoupler, for example the voltage supplied by a phototransistor arranged in the optocoupler, is preferably used to produce the actual signal for the PI regulator.

The duty ratio which is intended to be controlled is preferably varied by varying the nominal signal supplied to the PI regulator. The duty ratio may be, for example, 50:50.

In one preferred exemplary embodiment, the PI regulator is an inverting PI regulator, that is to say the nominal signal is connected to the positive input of the operational amplifier in the PI regulator, while the actual signal is connected to the negative input of the operational amplifier.

Further advantageous embodiments are described in the dependent claims.

BRIEF DESCRIPTION OF THE DRAWINGS

Exemplary embodiments of the invention will be described in more detail in the following text with reference to the attached drawings, in which.

DETAILED DESCRIPTION OF THE INVENTION

Figure 1:
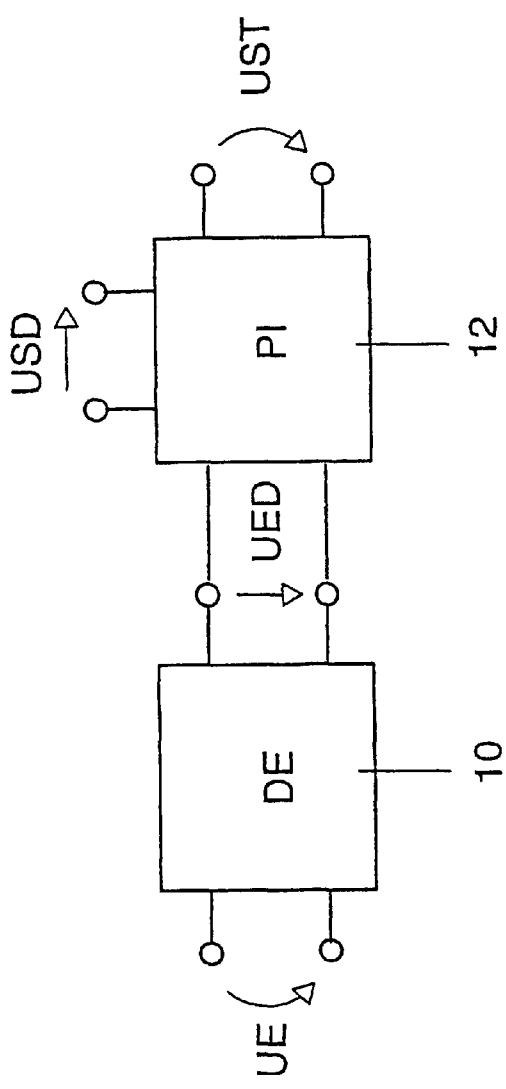
FIG. 1 shows a first embodiment of a circuit arrangement according to the invention illustrated in the form of a schematic block diagram.

FIG. 1 shows a first embodiment of a circuit arrangement according to the invention illustrated in the form of a block diagram. This circuit arrangement comprises a digitizer unit 10 to whose input side the analog voltage signal UE to be controlled is supplied. The analog voltage signal UE to be controlled may, in particular, be a rectified sinusoidal voltage signal. A digital form UED of the analog voltage signal UE is produced at the output of the digitization unit 10, with the digital signal UED having a predetermined duty ratio when the analog voltage signal UE is at a nominal value which can be predetermined. The digital signal UED or a signal which is correlated with it is supplied as the actual signal to a PI regulator 12. A signal USD is supplied as the nominal signal to the PI regulator 12. At its output, the PI regulator 12 produces a control signal UST which can be used for controlling the analog voltage signal UE. In particular, the control signal UST allows, for example, the frequency, the phase, the duty cycle or any other variable to be influenced, in order to influence the analog voltage signal UE. The control signal produced by the PI regulator 12 is of such a type that the control signal allows the analog voltage signal UE to be increased if the duty ratio is less than the predetermined duty ratio, allows the analog voltage signal UE to remain unchanged if the duty ratio corresponds to the predetermined duty ratio, and allows the analog voltage signal UE to be reduced if the duty ratio is greater than the predetermined duty ratio.

Figure 2:
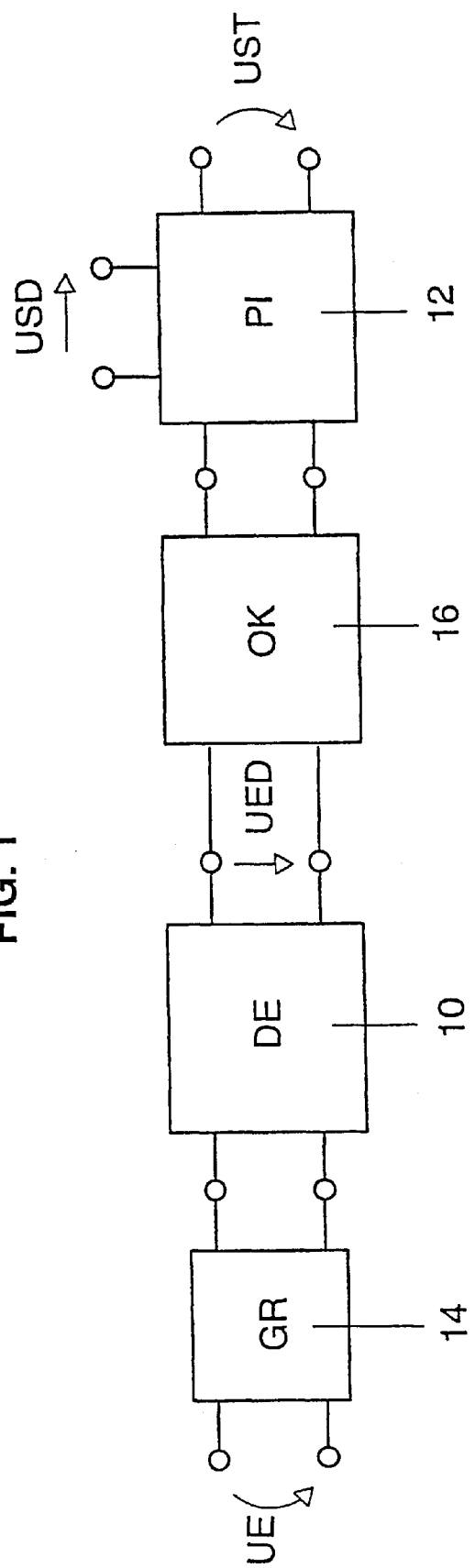
FIG. 2 shows a second embodiment of a circuit arrangement according to the invention illustrated in the form of a schematic block diagram.
Figure 3:
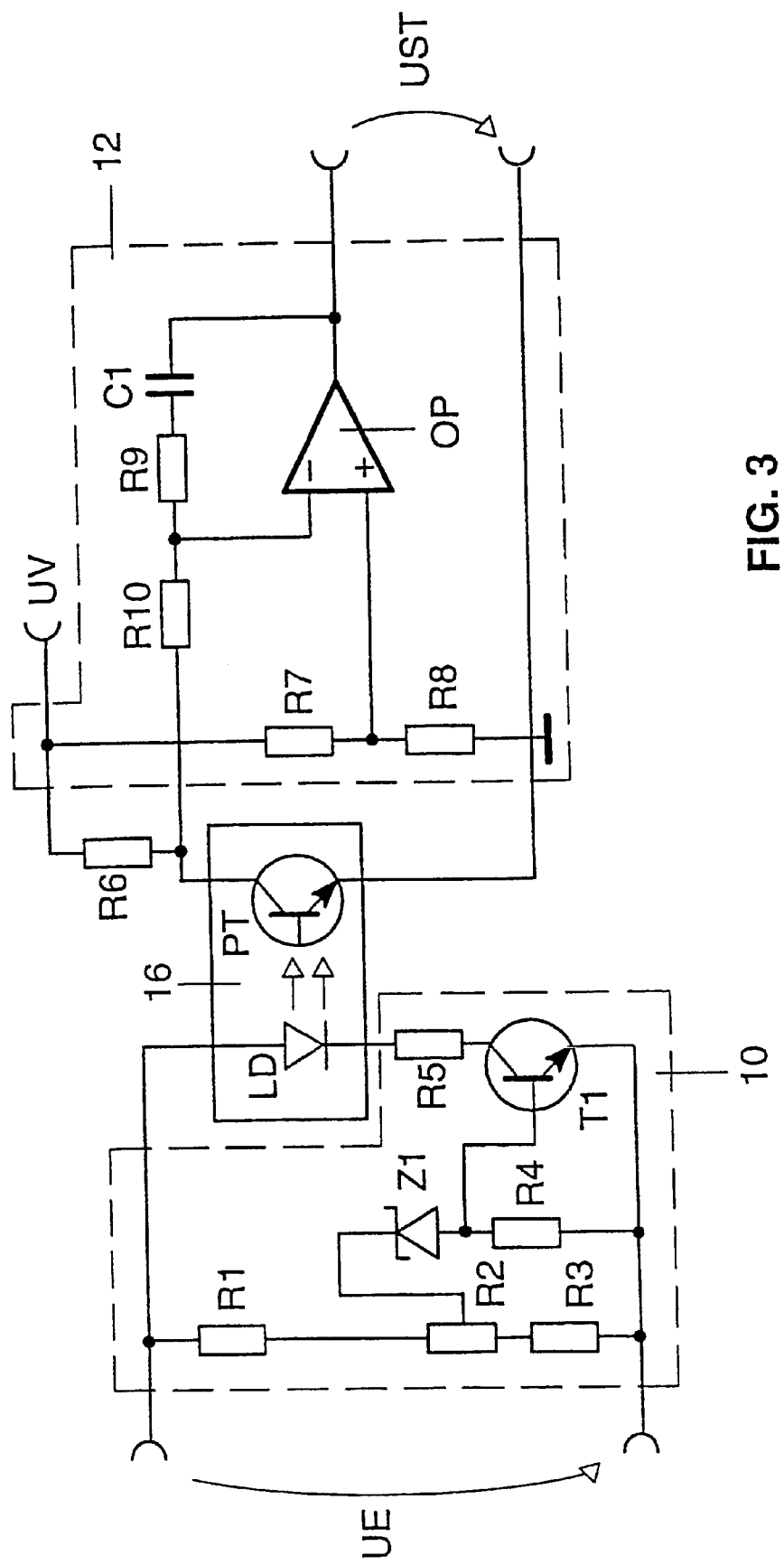
FIG. 3 shows the circuit diagram of a third embodiment of a circuit arrangement according to the invention.

In the embodiments of the invention illustrated in FIGS. 1 to 3, corresponding components are provided with the same reference symbols.

FIG. 2 shows a second embodiment of a circuit arrangement according to the invention. This once again comprises a digitizer unit 10 and a PI regulator 12. However, a rectifier 14 is connected between the input connection for the analog voltage signal UE [lacuna] and is used to rectify the analog voltage signal UE. An optocoupler 16 is connected between the digitizer unit 10 and the PI regulator 12, with the object of ensuring DC isolation between the input and the output of the circuit arrangement, in particular with regard to SELV conditions.

FIG. 3 illustrates a third embodiment of a circuit arrangement according to the invention, schematically in the form of a circuit diagram. The digitizer unit 10 is once again supplied with the analog voltage signal UE, already in rectified form. In the digitizer unit 10, the analog voltage signal UE is first of all supplied to a voltage divider comprising the resistors R1, R2, R3, with the resistor R2 being designed such that the division ratio can be varied. The divided-down voltage is supplied to the series circuit formed by a zener diode Z1 and a resistor R4. The zener diode Z1 is preferably chosen such that it is virtually temperature-independent. The junction point between the zener diode Z1 and the resistor R4 is connected to the base of a transistor T1. The transistor T1 is provided with an input signal whenever the voltage supplied to the series circuit comprising the zener diode Z1 and the resistor R4 is greater than the value predetermined by the choice of the zener diode Z1. For example, a zener diode Z1 designed for 5.1 V can be used for a rectified sinusoidal signal whose root mean square value is 11.6 V. If the root mean square nominal value of the input voltage signal UE is 11.6 V, this results in a signal with a duty ratio of 50:50 being produced. The collector of the transistor T1 is connected via a resistor R5 to an optocoupler 16, in particular to the light-emitting diode LD in the optocoupler 16. A phototransistor PT is arranged positioned suitably with respect to the light-emitting diode LD in the optocoupler 16, with the light-emitting diode LD and the phototransistor PT furthermore being arranged in such a manner that the SELV conditions are complied with, in particular with a withstand voltage of 4 kV being achieved. The phototransistor PT is connected via a resistor R6 to a supply voltage UV. The PI regulator 12 is designed such that it has a long time constant in comparison to the square-wave signal which is produced at the output of the digitizer unit 10. The PI regulator comprises an operational amplifier OP whose positive input is supplied with a voltage which can be varied by means of a voltage divider that is formed by the resistors R7, R8 and is connected to the supply voltage UV. If the resistors R7 and R8 are chosen to be identical, half the supply voltage appears at the positive input of the operational amplifier OP. The PI regulator furthermore comprises a resistor R9 and a capacitor C1 in the feedback loop of the operational amplifier OP, and a resistor R10 between the optocoupler 16 and the negative input of the operational amplifier. The PI regulator 12 is thus in the form of an inverting PI regulator, that is to say it integrates upward when the actual duty ratio is less than the predetermined duty ratio, and integrates downward when the actual duty ratio is greater than the predetermined duty ratio. The PI regulator stops its integration process when the duty ratio at that time corresponds to the predetermined duty ratio.

The nominal signal can be varied between 0 V and the supply voltage UV depending on the choice of the resistors R7 and R8. The nominal variable can be inverted by connecting the resistor R6 to the emitter of the phototransistor PT, with the connection for R10 being interchanged in a corresponding manner.

Fluctuations in the supply voltage UV which would affect the precision of the PI regulator 12 can be countered by using a zener diode and a series resistor to stabilize the supply voltage connection.

The control voltage signal UST is preferably used to keep the input voltage UE constant by frequency variation. Other possibilities for using the control signal UST for controlling the input voltage UE are obvious to a person skilled in the art, for example changing the phase gating angle, start delay etc.

What is claimed is:

1. A circuit arrangement for controlling an analog voltage signal comprising:
    an input connection for applying the analog voltage signal (UE);
    a digitizer unit (10) which uses the analog voltage signal (UB) to produce a digital signal (UED), the digital signal has a predetermined duty ratio when the analog voltage signal (UB) is at a nominal value;
    a PI regulator (12) to which, as the input signal, a nominal signal (USD) and an actual signal which is correlated with the digital signal (UED) is supplied and at whose output a control signal (UST) for controlling the analog voltage signal (UE) is produced, in such a manner that the control signal (UST) allows the analog voltage signal (UE) to be increased if the duty ratio of the digital signal is less than the predetermined duty ratio, allows the analog voltage signal (UE) to remain unchanged if the duty ratio of the digital signal corresponds to the predetermined duty ratio, and allows the analog voltage signal (UE) to be reduced if the duty ratio of the digital signal is greater than the predetermined duty ratio.

2. The circuit arrangement as claimed in claim 1, wherein an apparatus (14) for rectifying the analog voltage signal (UE) is arranged between the input connection and the digitizer unit (10).

3. The circuit arrangement as claimed in claim 1, wherein
    the PI regulator (12) has a time constant Tp, with the digital signal (UED) being a signal, in particular a square-wave signal, at a frequency fd>1/Tp.

4. The circuit arrangement as claimed in one of claim 1, wherein the digitizer unit comprises:
    a voltage divider (r1, r2, r3) by means of which a partial input voltage signal is produced which corresponds to the analog input voltage signal (UE), a series circuit having a zener diode (Z1) and a resistor (R4), to which the partial input voltage signal is supplied; and a switching element (T1) to which the signal at the junction point between the zener diode (Z1) and the resistor (R4) is supplied as a control signal.

5. The circuit arrangement as claimed in claim 4, wherein an optocoupler (16) is arranged between the digitizer unit (10) and the PI regulator (12).

6. The circuit arrangement as claimed in claim 5, wherein the optocoupler (16) is connected in series with an output connection of the switching element (T1).

7. The circuit arrangement as claimed in claim 5, wherein the actual signal is correlated with the output (signal from the optocoupler (16).

8. The circuit arrangement as claimed in claim 1, wherein the duty ratio is variable, in particular by variation of the nominal signal supplied to the PI regulator (12).

9. The circuit arrangement as claimed in claim 8, wherein the duty ratio is 50:50.

10. The circuit arrangement as claimed claim 1, wherein the PI regulator (12) is an inverting PI regulator.

* * * * *